United States Patent Office 3,392,118
Patented July 9, 1968

3,392,118
FORMAL OF DIENE POLYMER CONTAINING TERMINAL HYDROXYL GROUPS AND MINERAL OIL CONTAINING SAME
Henry V. Isaacson, Oak Forest, and David W. Young, Homewood, Ill., assignors to Sinclair Research, Inc., New York, N.Y., a corporation of Delaware
No Drawing. Filed June 9, 1966, Ser. No. 556,265
13 Claims. (Cl. 252—51.5)

ABSTRACT OF THE DISCLOSURE

Polymeric formals are prepared by condensing about 1 to 3 moles of hydroxyl-containing diene polymer (e.g., hydroxylated polybutadiene) of about 200 to 12,000 molecular weight with a mole of formaldehyde. The resultant formals which have molecular weights of about 4,000 to 25,000 and range from viscous liquids to elastomeric solids, are useful, for example, as viscosity index improvers in mineral oil hydrocarbons.

---

This invention relates to novel polymeric formals and their method of preparation. More particularly, it relates to the condensation of a hydroxyl-containing diene polymer with formaldehyde to form polymeric materials having utilities, for example, in coating, molding, caulking, lubricating, etc., compositions.

It has now been found that useful polymeric formals can be obtained by condensation of a hydroxyl-containing diene polymer with formaldehyde in a molar ratio of diene polymer to aldehyde of about 1 to 3:1 and preferably approximately 2:1. These condensation products range from viscous, grease-like liquids to elastomeric solids usually ranging in average molecular weight from about 4,000 to 25,000 (Staudinger), preferably about 10,000 to 20,000, and are of value in such diverse applications as surgical tape adhesives, viscosity index improvers in mineral oils, coating materials, asphalt blending aids, tree banding compounds, chewing gum bases, caulking compounds and as extenders and plasticizers for rubbers, for example as substitutes for vulcanized vegetable oils such as Factice.

In accordance with the present invention the novel formals can be prepared by condensation in an acidic medium, using various techniques and methods for formal preparation. By the term formal is meant herein a compound containing the —O—$CH_2$—O— group. The condensation reaction can be effected by mixing the two reactants, the diene polymer and the aldehyde, in the presence of an acidic catalyst. While room temperatures may be sufficient for the reaction to proceed, often elevated temperatures are desired; depending, for example, on the particular catalyst employed, temperatures from about 70 to 105° C. to 180 or 200° C. may be used with advantage. Preferably, the reaction may be carried out by refluxing the aldehyde with the polybutadiene. The reaction time may vary according to catalyst concentration, reactant proportions, the molecular weight of the product desired, etc. Preferred reaction times may be in the range of about 3 to 10 hours. Atmospheric or elevated pressures may be employed, the former, since it is less costly, perhaps being preferred.

The diene polymers for use in the preparation of the novel formals of this invention generally have on the average at least about 1.8 predominantly primary, terminal, i.e. attached to a terminal carbon atom, hydroxyl groups per polymer molecule. Most advantageously, the polymer has greater than two average allylic, terminal hydroxyl groups, e.g. at least 2.1 to, say, 2.6 or even 3 or more. Also, two terminal hydroxyls are generally separated by a long carbon-carbon chain. Determined as milliequivalents of potassium hydroxide equivalent to the hydroxyl content of one gram of polymer, the diene polymers will often have a hydroxyl value of about 0.5 to 1.5, preferably 0.7 to 1.0. The hydroxyl-containing diene polymers used in the present invention have number average molecular weights in the range of about 200 to 12,000 (Staudinger) and viscosities at 30° C. of about 5 to 10,000 poises. The preferred polymers will be in the molecular weight range of about 1200 to 7000 with viscosities at 30° C. of about 15 to 5000 poises. The preferred diene polymers also have the majority of their unsaturation in the main hydrocarbon chains.

The dienes which are employed to make the hydroxyl-containing polymers are unsubstituted, 2-substituted or 2,3-disubstituted 1,3-dienes of up to about 12 carbon atoms. The diene preferably has up to 6 carbon atoms and the substituents in the 2- and/or 3-position may be hydrogen, alkyl, generally lower alkyl, e.g. of 1–4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, etc.

Other olefinically unsaturated monomers may also be incorporated into the diene polymers used in this invention. Generally, they will be present only in minor amounts, say up to about 40 percent by weight of the total monomers. Usable monomers include alpha-mono-olefinic materials of about 2 or 3 to 10 or 12 carbon atoms such as styrene, vinyl toluene, mono-alkenes, etc., as well as trienes such as allomercene.

The number and location of the hydroxyl groups and the molecular weight of the diene polymer may be a function of polymerization temperature and the type of addition polymerization system employed in forming the polymer. It has been found that diene polymers of the desired configuration may be obtained using hydrogen peroxide as the catalyst for polymerization. This free-radical addition polymerization usually takes place at a temperature of about 100 to 200° C., preferably about 115 to 200° C. The reaction preferably takes place in a mutual solvent system; that is, one which dissolves both the diene monomer and the hydrogen peroxide. Suitable solvents are isopropanol, acetone, methanol, sec-butanol, n-butanol, n-propanol and like alcohols having 2 to about 12 carbon atoms. The $H_2O_2$-solvent system is found to supply hydroxyl groups and the catalytic and solvent effects needed to produce the diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymer. The alcohol will be free of any group which would interfere with the production of the diene polymer. Saturated alcohols are preferred and often those having about the same carbon atom content as the diene monomer will be found most useful. For example, when the monomer is butadiene, propanol or isopropanol may be preferred. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerizations or enter into the product. The peroxide material may be used in amounts of about 1 to 10 percent of the reaction mixture to assure a low molecular weight addition polymer product having the desired number of hydroxyl groups per molecule.

By the above-described polymerization method, polymers, especially in the above-indicated molecular weight ranges, are produced from diene monomers in which aqueous hydrogen peroxide is virtually insoluble. If the monomer material is merely mixed with aqueous hydrogen peroxide, then two phases result and only a very small amount of solid polymer is produced at the interface between them. However, when there is combined with an appropriate amount of aqueous hydrogen peroxide an appropriate proportion of mutual solvent-diluent, then this combination, when added to butadiene, for example, forms a clear homogeneous solution therewith and at elevated temperatures, e.g. above 100° C., preferably about 115 to 200° C., polymerization is initiated which can be controlled to maintain the polymerization at desired temperature, to obtain in say 1 to 4 hours a conversion of from about 40% to about 60% of the monomer to polymer. The product, when freed of unreacted and residual materials, is a clear-white, viscous liquid polybutadiene predominantly of 1,4 configuration.

To cite an example of the preferred chemical structure of the diene polymer employed to prepare the formals of this invention, a simplified structural formula of polybutadiene may be given as:

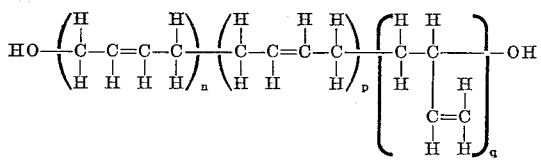

in which $n$ plus $p$ is greater than $q$, that is, the in-chain unsaturation accounts for more than 50% of the unsaturation. One or more of the H atoms appearing in the above formula will be replaced by hydroxyl in at least some of the molecules. This formula should not be understood as implying that the polymers are necessarily in blocks, but the cis-1,4-, trans-1,4- and vinyl (1,2) unsaturation are usually distributed throughout the polymer molecule. The letter $n$ may be a number sufficient to give a cis-1,4-unsaturation content of about 10–30 percent; $p$ may be a number sufficient to give a trans-1,4-unsaturation content to the polymer in the range of about 40–70 percent while $q$ may be sufficient to give a pendant 1,2-vinyl unsaturation of about 10–35 percent. Often the polymer will contain largely trans-1,4-units, e.g. about 50–65 percent, and about 15–25 percent cis-1,4-units, with about 15–25 percent 1,2-units. Branching may also occur in the above polymers, especially those prepared at higher temperatures. It should be emphasized, however, that the present invention is not necessarily limited to the use of hydroxyl-containing diene polymers having the predominating trans-1,4-structure, although such are highly preferred, where otherwise suitable polymers having high cis-1,4-forms are available.

Also, the diene polymers used in this invention may be given improved color, odor and oxidation and ozone resistance by hydrogenating, prior to reacting with formaldehyde, to a more saturated condition. Usually, the hydroxyl-containing polymers will at most be only partially hydrogenated, so as to provide a polymer having the aforementioned improved properties of stability, etc., but which will still possess substantial hydroxyl functionality for entering into reaction with the formaldehyde.

The formaldehyde to be reacted with the hydroxyl-containing diene polymer may be added to the reaction mixture as such or as a formaldehyde-generating precursor such as the low molecular weight homopolymeric forms of formaldehyde, e.g. paraformaldehyde, metaformaldehyde, etc.

Acidic materials which may be used as the catalyst in the preparation of the formals can be inorganic or organic acid condensation catalysts such as hydrochloric acid, sulfuric acid, sulfamic acid, p-toluene-sulfonic acid, sodium bisulfate, phosphoric acid, ion exchange resins, etc. The acidic materials may be deposited on a carrier, as for example, silica-containing compounds such as kieselguhr, if desired. Catalysts need only be present in trace amounts for condensation to proceed, but larger catalyst concentrations may be used, for example, up to about 0.2% by weight of the reactants, or even more. Entraining liquids such as hexane, heptane fractions, benzene and the like may be used in order to remove the water of reaction, although good yields are readily obtainable without a water entrainer. The use of solvents, whether as water entrainers or not, is generally recommended to ensure thorough mixing of the reactants and to maintain the polymeric formal product in solution. Hydrocarbon solvents, particularly aliphatic hydrocarbons, are preferred and may be added alone or with one of the reactants, e.g. formaldehyde, dissolved therein.

The following examples are included to further illustrate the preparation of the novel formals of the present invention.

EXAMPLE I

A hydroxyl-containing polybutadiene oil was first prepared by polymerizing 100 parts of butadiene-1,3 in the presence of 35 parts of isopropanol and 6 parts of hydrogen peroxide for 2½ hours at 130° C. There resulted a homopolymer having a viscosity at 30° C. of 200 poises, a hydroxyl value of 0.80 meq./gm. (milliequivalents of KOH per gram of polymer), an average molecular weight of 3000–3500, about 2.6 allylic, terminal hydroxyl groups per polymer molecule and an iodine number of 395.

To 250 grams of this polybutadiene oil were added 3 grams of trioxymethylene, 500 milliliters of n-heptane and 1 gram of potassium bisulfate and the mixture heated to reflux. After refluxing for 8 hours, the reaction mixture was cooled and the heptane and water of reaction were stripped off leaving a rubbery material.

EXAMPLE II

Another hydroxyl-containing polybutadiene oil was made by polymerizing 100 parts of butadiene-1,3 in the presence of 70 parts of isopropanol and 10 parts of hydrogen peroxide in an aluminum-clad autoclave at 118° C. for 2 hours. The resultant homopolymer had a viscosity of about 50 poises at 30° C., a hydroxyl value of about 0.95 meq./gm., an average molecular weight of 2200–2500, about 2.1 to 2.2 allylic, terminal hydroxyl groups per polymer molecule and an iodine number of 398.

To 200 grams of this polybutadiene oil were added 6 grams of trioxymethylene, 800 milliliters of n-heptane and 1 gram of sodium bisulfate and the mixture heated to reflux. Refluxing was continued for 7 hours followed by cooling of the reaction mixture and stripping off of the heptane and entrained water.

EXAMPLE III

A third elastomer was prepared employing the same reactants and conditions of Example II, but using only 3 grams of trioxymethylene instead of 6 grams.

The polymeric formals obtained in the foregoing Examples I–III exhibited Staudinger molecular weights in the range of 8,000–17,000, were colorless to white in appearance and were soluble in, for example, aliphatic hydrocarbons, wax and natural rubber.

The polymeric formals of the present invention find utility as, among other applications, viscosity index improvers in mineral oil hydrocarbons, including normally liquid petroleum oils boiling primarily above the gasoline range such as, for instance, lubricating oils, diesel fuels, fuel oils, etc. The oils can be in a relatively crude state or they can be treated in accordance with well known commercial methods, such as acid or caustic treatment, solvent refining, clay treatment, hydro-treating, etc. Oils of lubricating viscosity which can be improved by addition of the condensation products of the invention are, for instance, solvent extracted or solvent refined oils obtained in accordance with conventional methods of solvent refining lubricating oils. Often the lubricating oils have viscosities from about 20 to 250 SUS at 210° F.

The base oil may be derived from paraffinic, naphthenic, asphaltic or mixed base crudes. Also, a blend of refined lubricating oils such as a blend of solvent treated Mid-Continent neutrals and Mid-Continent bright stocks may be employed.

The amount of the novel polymeric formal added to the base oil may be dependent upon the particular oil employed, but in all cases, will be that sufficient to improve the viscosity index significantly. Often the amounts will fall within the range of about 0.1 to 10% or more by weight, preferably about 0.5 to 7% by weight based on the mineral oil. The mineral oil composition may also contain other additives commonly added to such base oils as, for instance, antioxidants, extreme pressure agents, pour depressors, corrosion inhibitors, and the like.

The formal condensation products of Examples I, II and III were dissolved in a neutral mineral lubricating oil and tested as viscosity index improvers. Results of the tests are recorded in Table I below.

TABLE I

Oil (Neat):
KV/100, 43.87.
KV/210, 6.194.
VI, 95.
After sonic shear (30 min. test at room temperature):
KV/100, 43.70.
KV/210, 6.183.
VI, 95.

|  | 1% (Ex. I) in Oil | 3% (Ex. I) in Oil | 5% (Ex. I) in Oil |
|---|---|---|---|
| KV/100 | 44.61 | 46.97 | 48.04 |
| KV/210 | 6.452 | 7.349 | 7.469 |
| VI | 103 | 124 | 124 |
| After sonic shear (30 min. test at room temperature): | | | |
| KV/100 | 44.57 | 46 | 47.42 |
| KV/210 | 6.379 | 6.808 | 7.074 |
| VI | 100.6 | 111.8 | 115 |

|  | 1% (Ex. II) in Oil | 3% (Ex. II) in Oil | 5% (Ex. II) in Oil |
|---|---|---|---|
| KV/100 | 44.36 | 51.17 | |
| KV/210 | 6.225 | 8.431 | |
| VI | 95 | 135 | |
| After sonic shear (30 min. test at room temperature): | | | |
| KV/100 | 44.23 | 50.43 | |
| KV/210 | 6.278 | 7.298 | |
| VI | 97.6 | 113.6 | |

|  | 1% (Ex. III) in Oil | 3% (Ex. II) in Oil | 5% (Ex. III) in Oil |
|---|---|---|---|
| KV/100 | 45.99 | 48.79 | 57.78 |
| KV/210 | 6.671 | 6.991 | 8.297 |
| VI | 107 | 109 | 120 |
| After sonic shear (30 min. test at room temperature): | | | |
| KV/100 | 45.08 | 48.81 | 57.70 |
| KV/210 | 6.482 | 6.908 | 8.289 |
| VI | 103 | 106.5 | 119.9 |

The results observed in the above table are indicative of the improvements in viscosity index effected by the polymeric formals of the present invention when added to mineral oil in concentrations as low as 1 percent by weight. Resistance to shear of the resultant blends is evidenced by the observation that even after being subjected to 30 minutes of sonic shear the formal-supplemented mineral oils exhibited higher viscosity indices than that of the straight mineral oil.

It is claimed:

1. The condensation reaction product of a polymer of a diene of 4 to 12 carbon atoms, said polymer having at least about 1.8 predominantly primary, terminal hydroxyl groups per polymer molecule and a Staudinger molecular weight of about 200 to 12,000, and formaldehyde; said diene being selected from the group consisting of unsubstituted, 2-substituted, and 2,3-disubstituted 1,3-diene hydrocarbons wherein the substituents are selected from the group consisting of lower alkyl, aryl, halogen, nitro, nitrile and cyano groups; the molar ratio of combined diene polymer to combined formaldehyde being about 1 to 3:1 and the Staudinger molecular weight of the reaction product being about 4,000 to 25,000.

2. The condensation reaction product of claim 1 wherein said diene is 1,3-butadiene.

3. The condensation reaction product of claim 1 having a Staudinger molecular weight of about 10,000 to 20,000.

4. A composition of improved viscosity index consisting essentially of a major amount of a normally liquid mineral oil boiling primarily above the gasoline range and a minor, effective amount of the condensation reaction product of claim 1.

5. The composition of claim 4 wherein the condensation reaction product is present in an amount of about 0.1 to 10 percent by weight of the mineral oil.

6. A composition of improved viscosity index consisting essentially of a major amount of a normally liquid mineral oil boiling primarily above the gasoline range and a minor, effective amount of the condensation reaction product of claim 2.

7. The composition of claim 6 wherein the condensation reaction product is present in an amount of about 0.1 to 10 percent by weight of the mineral oil.

8. The condensation reaction product of claim 2 wherein said polymer has about 2.1 to 3 predominantly primary, terminal hydroxyl groups per polymer molecule.

9. The condensation reaction product of claim 8 wherein said polymer has a Staudinger molecular weight of about 1200 to 7000.

10. A composition of improved viscosity index consisting essentially of a normally liquid mineral oil having a viscosity from about 20 to 250 SUS at 210° F. and about 0.1 to 10 percent, by weight of the oil, of the condensation reaction product of claim 9.

11. The composition of claim 10 wherein the molar ratio of combined diene polymer to combined formaldehyde in said condensation reaction product is about 2:1.

12. The condensation reaction product of a polymer of a diene selected from the group consisting of 1,3-butadiene, isoprene, chloroprene, 2-cyano-1,3-butadiene, and 2,3-dimethyl-1,3-butadiene, said polymer having about 2.1 to 3 predominantly primary, terminal hydroxyl groups per polymer molecule and a Staudinger molecular weight of about 200 to 12,000, and formaldehyde; the molar ratio of combined diene polymer to combined formaldehyde being about 1 to 3:1 and the Staudinger molecular weight of the reaction product being about 4,000 to 25,000.

13. A composition of improved viscosity index consisting essentially of a major amount of a normally liquid mineral oil boiling primarily above the gasoline range and a minor, effective amount of the condensation reaction product of claim 12.

References Cited

UNITED STATES PATENTS

| | | | |
|---|---|---|---|
| 2,066,120 | 12/1936 | Morrell | 260—73 X |
| 2,386,735 | 10/1945 | Borders et al. | 260—73 X |
| 2,682,532 | 6/1954 | Adelman | 252—52 X |
| 2,796,401 | 6/1957 | Matuszak et al. | 252—52 X |
| 2,796,423 | 6/1957 | Cottle et al. | 252—52 X |
| 3,135,716 | 6/1964 | Uraneck et al. | 260—73 X |
| 3,260,710 | 7/1966 | Brannen et al. | 252—52 X |

DANIEL E. WYMAN, *Primary Examiner.*

W. H. CANNON, *Assistant Examiner.*